(No Model.)

E. H. PORTER.
DYNAMO ELECTRIC MACHINE OR ELECTRIC MOTOR.

No. 538,345.  Patented Apr. 30, 1895.

WITNESSES:
a. E. Pfaff.
Beatrice Williams.

INVENTOR.
E. H. PORTER.
BY Edward P. Thompson,
ATTORNEY.

UNITED STATES PATENT OFFICE.

EDWIN H. PORTER, OF RADFORD, VIRGINIA.

DYNAMO-ELECTRIC MACHINE OR ELECTRIC MOTOR.

SPECIFICATION forming part of Letters Patent No. 538,345, dated April 30, 1895.

Application filed August 11, 1894. Serial No. 520,003. (No model.)

*To all whom it may concern:*

Be it known that I, EDWIN H. PORTER, a citizen of the United States of America, and a resident of Radford, in the county of Montgomery and State of Virginia, have invented certain new and useful Improvements in Dynamos or Motors, (Case No. 1,) of which the following is a specification.

My invention relates to a dynamo or motor, especially to the construction whereby I obtain four poles for each of the two armatures by the application of only six field coils.

Broadly, my invention consists of one magnetic frame having six pole pieces with coils and embracing two armatures in such a way as to furnish each with a four pole field.

The invention is represented in the accompanying drawings.

Figure 1:
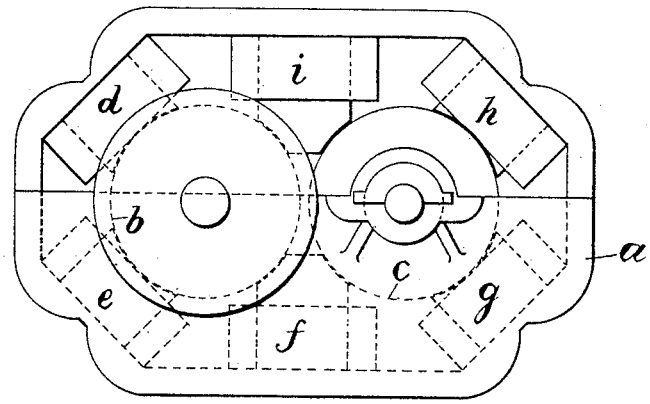
Figure 2:
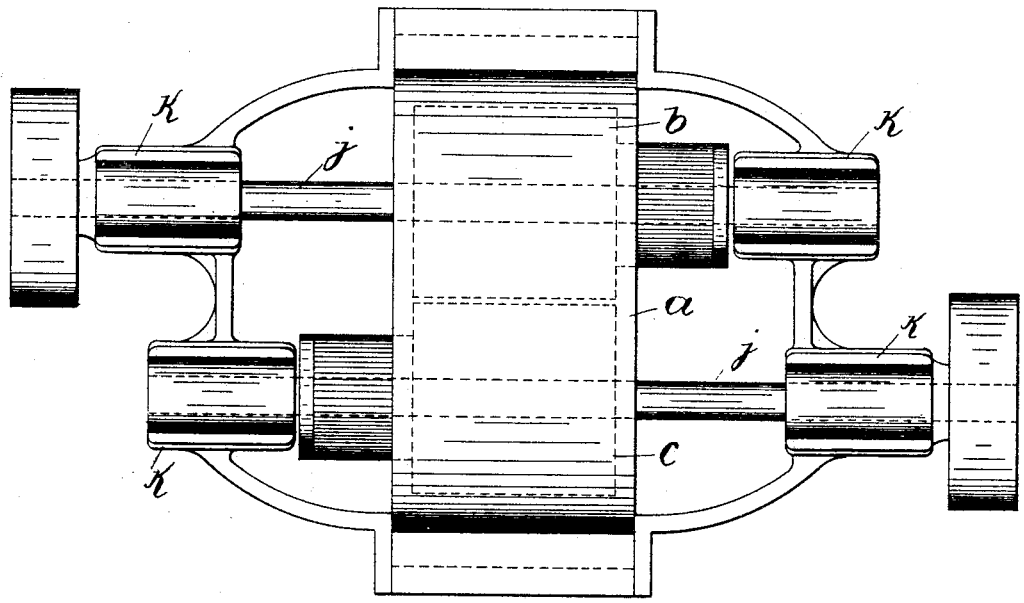

Figure 1 is a side elevation of the machine in which certain hidden parts are indicated by dotted lines. Fig. 2 is a plan of the machine by which the relative arrangements and shapes are better shown than in Fig. 1.

There is a closed iron or magnetic frame $a$, surrounding both armatures $b$, and $c$. The axes of the armatures are parallel to each other and the armatures themselves are so located as to just escape touching each other. The field magnet coils are lettered in order, $d$, $e$, $f$, $g$, $g$, and $i$. The two pairs of coils $d$, $e$, and $h$, $g$, have their axes perpendicular respectively to the axes of the armatures. The remaining pair has the axes perpendicular to the plane which includes the axes of the armatures. The axles $j$, of the armatures, are carried in bearings $k$, which are supported by the magnetic frame $a$.

My invention becomes useful, especially in electric cars, where available space for motors is scarce and valuable, and where at the same time two armatures are needed for purposes of efficient regulation.

By constructing the motor or dynamo in the manner indicated, I obtain simplicity in combination with efficiency.

I claim as my invention—

1. A dynamo or motor consisting of a single magnetic frame having six pole pieces with coils and armatures embraced therein in such relation that each has a four pole field.

2. A dynamo or motor consisting of the combination of a single magnetic frame embracing two armatures whose axes are parallel, and six field magnet coils, the axes of four of which are perpendicular in pairs to the respective armature axes, and the axes of the others being perpendicular to that plane which includes the axes of the armatures.

In testimony that I claim the foregoing as my invention I have signed my name, in presence of two witnesses, this 14th day of June, 1894.

EDWIN H. PORTER. [L. S.]

Witnesses:
CHAS. M. CALDWELL,
CARROLL B. MOUNT.